(12) United States Patent
Woodley et al.

(10) Patent No.: US 11,780,437 B2
(45) Date of Patent: *Oct. 10, 2023

(54) CONTROLLING MOVEMENT OF A VEHICLE

(71) Applicant: JAGUAR LAND ROVER LIMITED, Warwickshire (GB)

(72) Inventors: Jonathan Woodley, Coventry (GB); Roxana Ciovnicu, Coventry (GB); Andrew Fairgrieve, Coventry (GB); Navid Shamshiri, Coventry (GB)

(73) Assignee: JAGUAR LAND ROVER LIMITED, Coventry (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/698,392

(22) Filed: Mar. 18, 2022

(65) Prior Publication Data

US 2022/0203981 A1 Jun. 30, 2022

Related U.S. Application Data

(63) Continuation of application No. 16/479,238, filed as application No. PCT/EP2018/051319 on Jan. 19, 2018, now Pat. No. 11,305,767.

(30) Foreign Application Priority Data

Jan. 30, 2017 (GB) ..................... 1701441

(51) Int. Cl.
*B60W 30/14* (2006.01)
*G05D 1/00* (2006.01)
*G05D 1/02* (2020.01)

(52) U.S. Cl.
CPC ......... *B60W 30/146* (2013.01); *G05D 1/0033* (2013.01); *G05D 1/0223* (2013.01);
(Continued)

(58) Field of Classification Search
CPC .......... B60W 30/146; B60W 2420/42; B60W 2510/20; B60W 2510/22; B60W 2520/16;
(Continued)

(56) References Cited

U.S. PATENT DOCUMENTS 6,480,769 B1 11/2002 Kageyama
6,600,979 B1 7/2003 Kumar et al.
(Continued)

FOREIGN PATENT DOCUMENTS

CN 101935969 A 1/2011
CN 103754228 A 4/2014
(Continued)

OTHER PUBLICATIONS

"Remote Control Range RoverSport—Demonstration" https:/Avww.youtube.com/watch?v=gwOzRdlhl8M Jun. 16, 2015.*
(Continued)

*Primary Examiner* — Brian P Sweeney
(74) *Attorney, Agent, or Firm* — Carlson, Gaskey & Olds, P.C.

(57) ABSTRACT

Apparatus for controlling movement of a vehicle, a system and vehicle comprising the apparatus, and a method for controlling the movement of a vehicle are disclosed. The apparatus comprises a controller configured to receive first signals from a receiving means in dependence on received transmitted signals from a remote control device indicating a requested motion of a vehicle and to receive second signals indicative of a value of traction of the vehicle. A maximum speed value for the vehicle is determined in dependence on the value of traction of the vehicle and/or on one or both of the detected pitch and roll angles of the vehicle. The controller provides an output signal for controlling speed of
(Continued)

the vehicle based on the requested motion. The output signal is limited dependent upon the maximum speed value determined by the controller.

20 Claims, 9 Drawing Sheets

(52) U.S. Cl.
CPC ...... *B60T 2201/02* (2013.01); *B60W 2420/42* (2013.01); *B60W 2510/20* (2013.01); *B60W 2510/22* (2013.01); *B60W 2520/16* (2013.01); *B60W 2520/18* (2013.01); *G05D 2201/0213* (2013.01)

(58) Field of Classification Search
CPC ......... B60W 2520/18; B60W 2520/10; B60W 2520/105; B60W 2520/14; B60W 2520/28; B60W 2552/40; B60W 2556/45; B60W 50/00; B60W 50/0098; B60W 2720/10; G05D 1/0033; G05D 1/0223; G05D 2201/0213; G05D 1/00; G05D 1/0011; B60T 2201/02
See application file for complete search history.

(56) References Cited

U.S. PATENT DOCUMENTS

| | | |
|---|---|---|
| 2002/0016653 A1 | 2/2002 | Levine |
| 2003/0014174 A1 | 1/2003 | Giers |
| 2005/0101436 A1 | 5/2005 | Funato et al. |
| 2007/0032913 A1 | 2/2007 | Ghoneim et al. |
| 2008/0208416 A1 | 8/2008 | Yuet et al. |
| 2009/0326777 A1 | 12/2009 | Oshima et al. |
| 2010/0076660 A1 | 3/2010 | Folk |
| 2013/0110336 A1 | 5/2013 | Braier et al. |
| 2013/0138288 A1 | 5/2013 | Nickolaou et al. |
| 2013/0197760 A1 | 8/2013 | Castaneda et al. |
| 2014/0358382 A1 | 12/2014 | Kon et al. |
| 2017/0008563 A1 | 1/2017 | Popken et al. |
| 2017/0072955 A1 | 3/2017 | Ediger et al. |
| 2017/0182989 A1 | 6/2017 | Takeda et al. |

FOREIGN PATENT DOCUMENTS

| | | |
|---|---|---|
| DE | 502005001719 | 11/2007 |
| GB | 2499301 A | 8/2013 |
| GB | 2526346 A | 11/2015 |
| GB | 2536709 A | 9/2016 |
| JP | 2005001548 A | 1/2005 |
| JP | 2011085999 A | 4/2011 |
| KR | 19990059746 A | 7/1999 |
| WO | 01079015 A1 | 10/2001 |
| WO | 2015038705 A1 | 3/2015 |
| WO | 2015101102 A1 | 7/2015 |
| WO | 2016/013376 A1 | 1/2016 |

OTHER PUBLICATIONS

"Futuretech: theremote-control Range RoverSport driven from your smartohone" https:/Avwww.carmagazine.co.uk/car-news/motoring-issues/20 1 5/future-tech-the-remote-control-range-rover-sport/ Jun. 16, 2015.*
"Remote-control Range Rover can be driven with a smartphone app" https://newatlas.com/remote-control-range-rover-smartphone/38031/Jun. 16, 2015.*
Combined Search and Examination Report under Sections 17 and 18(3) for Application No. GB1701442.4 dated Jun. 30, 2017.
Combined Search and Examination Report under Sections 17 and 18(3) for Application No. GB1701444.0 dated July 3, 2017.
Combined Search and Examination Report under Sections 17 and 18(3) for Application No. GB1701441.6 dated Jun. 28, 2017.
International Search Report and Written Opinion of the International Searching Authority for International application No. PCT/EP2018/051319 dated May 22, 2018.
"Remote Control Range Rover Sport-Demonstration," https://www.youtube.com/watch?v=gw0zRdlhl8M Jun. 16, 2015.
"Futuretech: theremote-control Range RoverSport driven from y our smartphone," https://www.carmagazine.co.uk/car-news/motoring-issues/2015/future-tech-the-remote-control-range-rover-sport/ Jun. 16, 2015.
Combined Search and Examination Report under Sections 17 and 18(3) for Application No. GB2019328.0 dated Mar. 10, 2021.
Chinese Patent Application No. 201880009253-1, office action dated Oct. 26, 2021.

* cited by examiner

CONTROLLING MOVEMENT OF A VEHICLE

CROSS REFERENCE TO RELATED APPLICATION

This application is a continuation of U.S. patent application Ser. No. 16/479,238, filed Jul. 19, 2019, which is the national stage application of International application No. PCT/EP2018/051319, filed Jan. 19, 2018, which claims priority to United Kingdom Application No. GB 1701441.6, filed Jan. 30, 2017.

TECHNICAL FIELD

The present disclosure relates to controlling movement of a vehicle. In particular, but not exclusively, it relates to controlling movement of a road vehicle such as a car in a remote control mode of operation.

Aspects of the invention relate to apparatus for controlling movement of a vehicle, a system for controlling movement of a vehicle, a vehicle, a method of controlling movement of a vehicle, and a computer program.

BACKGROUND

Suitably equipped vehicles can be operated in a remote control drive mode via a remote device, such as a smart phone having a suitable remote control drive program, to provide convenient means for an operator of the vehicle to control movement the vehicle from a position outside of the vehicle. This may, for example, be to allow the operator to get a more immediate and encompassing view of the terrain, to allow the operator to carry out a task outside the vehicle, such as opening and subsequently closing a gate across the vehicle's path and manoeuvring the vehicle through the gate, or to park the vehicle—particularly in a restricted space.

One problem with such an arrangement is how to maximize the safety of the vehicle and people within the vicinity of the vehicle, including the vehicle operator, while the vehicle is being remotely controlled.

It is an aim of the present invention to address this problem.

SUMMARY OF THE INVENTION

Aspects and embodiments of the invention provide apparatus for controlling movement of a vehicle, a system for controlling movement of a vehicle, a vehicle, a method of controlling movement of a vehicle, and a computer program as claimed in the appended claims.

According to an aspect, there is provided apparatus for controlling movement of a vehicle, the apparatus comprising processing means configured to: receive first signals from a receiving means in dependence on received transmitted signals from a remote control device indicating a requested motion of a vehicle; receive second signals indicative of a value of traction of the vehicle; determine a maximum speed value for the vehicle in dependence on the value of traction of the vehicle; and provide an output signal for controlling speed of the vehicle based on the requested motion, wherein the output signal is limited dependent upon the maximum speed value. The value of traction of the vehicle is classified into discrete levels, and the maximum speed value is set at corresponding discrete levels in dependence on the level to which the value of traction is classified.

In this manner, the maximum speed at which the vehicle can be operated in the remote control drive mode can be limited in dependence on the traction available to the vehicle, thereby ensuring that the vehicle can be stopped within a certain distance or time. Thus, the operator of the remote control can be confident that the vehicle will not be permitted to inadvertently travel at a speed that could compromise the safety of the vehicle and people within the vicinity of the vehicle, including the operator.

In certain embodiments, the classification of the value of traction into discrete levels comprises the processing means being configured to: compare the value of traction of the vehicle to a first threshold value (T1) and a second threshold value (T2). If the value of traction of the vehicle is above the second threshold value (T2), then the value of traction is classified as 'high' and a relatively high maximum speed value level (S2) is set. If, however, the value of traction of the vehicle is above the first threshold value (T1) and below the second threshold value (T2), then the value of traction is classified as 'medium' and a relatively low maximum speed value level (S1) is set. If the value of traction of the vehicle is below the first threshold value (T1), then the value of traction is classified as low' and a maximum speed value level (S0) of zero is set. Hence, the maximum available speed for the vehicle in remote control drive mode can be restricted in a simple manner according to which of three levels of traction the current conditions meet. So, for particularly slippery conditions, such as for a value of traction corresponding to a low' coefficient of friction in the range of 0.1 to 0.40, the vehicle may be prevented from operating in a remote control drive mode—i.e. the vehicle speed may be restricted to a maximum speed of 0 kph. For conditions in which a high level of grip is available, such as for a value of traction corresponding to a 'high' coefficient of friction in the range of 0.61 to 1.0, the vehicle may be operated up to the full available speed in a remote control drive mode—typically 6 kph. For conditions between these extremes, where only a mid-level of grip is available, here being a value of traction corresponding to a 'medium' coefficient of friction in the range of 0.41 to 0.60, the vehicle speed may be restricted accordingly. By way of example, the maximum speed at which the vehicle may be operated may be limited to 3 kph. As such, if the operator attempts to request faster movement, that will be prevented. In certain embodiments, the low, medium and high coefficient of friction classifications may correspond to corresponding low, medium and high maximum speeds permissible in remote control drive mode; i.e. rather than preventing movements in low friction conditions, permitting movements of up to say 2 kph, with speeds up to 4 kph permitted when there is a medium friction classification, and up to 6 kph allowed in high friction conditions, as with the above example. In other embodiments, the level of traction may be divided into more or less than three classifications, with a corresponding number of threshold values.

The processing means may be configured to determine the value of traction from the second signals. In this embodiment, the determination of the value of traction is carried out at the processing means rather than receiving a pre-determined value of traction from another element.

The processing means may be configured to receive the second signals from at least one vehicle sensor. The vehicle sensor may provide data indicative of at least one of: wheel speeds; wheel loads; suspension heights; vehicle orientation; roll angle; pitch angle; vehicle ground speed; vehicle acceleration and deceleration; and steering rack force. In other words, the processing means can receive raw data from the vehicle sensors and determine from that data a value of traction of the vehicle.

In addition to or instead of receiving the second signals from one or more vehicle sensors, the processing means may be configured to receive the second signals from at least one vehicle controller. In this case, the at least one vehicle controller may provide data indicative of at least one of: a coefficient of friction of the tyres with the surface with which they are in contact; ABS intervention; and traction control intervention. Thus, the determination of the value of traction may be carried out in a separate element to the processing means and be communicated to the processing means in that form, ready for use in limiting the speed at which the vehicle can be operated, or the processing means may take that input and combine it with other data to determine the value of traction more holistically.

According to one aspect, there is provided a controller for determining a value of traction of the vehicle, the controller comprising processing means configured to: receive steering force signals indicative of a steering rack force; receive normal force signals indicative of a normal force at steerable wheels of the vehicle; determine a coefficient of friction between the steerable wheels and the ground in dependence on the steering force signals and the normal force signals; and provide an output signal dependent upon the coefficient of friction indicative of the value of traction of the vehicle. The coefficient of friction for the steerable tyres (either singly or as a set) may thus be inferred from the normal force at the steerable wheels and the steering rack force at any given time. From that, the overall value of traction for the vehicle can be determined. The output signal from the controller for determining a value of traction of the vehicle may correspond to the second signals indicative of a value of traction of the vehicle described above.

As well as limiting the maximum permissible speed according to the traction available, other requests from the remote control device may likewise be limited according to the available traction. By way of example, a request for acceleration may be limited according to the conditions, with an acceleration profile being a function of the traction available: e.g. a relatively steep acceleration profile being followed under high traction conditions, down to a shallow acceleration profile being followed under low traction conditions. Optionally, discrete acceleration profiles may be provided corresponding to the discrete classifications for the value of traction of the vehicle.

The processing means may be configured to determine, from the first signals or additional proximity signals received from a proximity sensing means, a distance value indicative of a distance from a point on the vehicle to an obstacle, in which case the maximum speed value for the vehicle is determined in dependence on the value of traction of the vehicle and on the distance value. Hence, the proximity of nearby obstacles may be taken as an additional factor for determining the maximum speed at which the vehicle should be allowed to travel, to ensure that the vehicle will be able to stop in advance of a collision with such an obstacle. The proximity sensing means may also be capable of determining a relative closing speed of the vehicle and the obstacle. In this way, movement of obstacles, such as people, animals or other vehicles, may be accounted for in the calculations and the determination of an appropriate maximum speed for the conditions which will ensure that the vehicle can be stopped in advance of a collision.

The processing means may be configured to determine, from additional angle signals received from an angle sensing means, one or both of a roll angle and a pitch angle of the vehicle, in which case the maximum speed value for the vehicle is determined in dependence on the value of traction of the vehicle and on one or both of the roll angle and the pitch angle. Accordingly, the contours of the terrain may be taken into account too, to ensure that the vehicle is kept under control. For example, the maximum allowable vehicle speed may be adjusted, in conjunction with the level of traction available and, optionally, with the proximity of obstacles, inversely proportional to the steepness of the gradient. In other words, if a remote operator requests a maximum 6 kph speed to climb or descend, then the processing means will adjust the actual vehicle speed by taking the pitch angle as well as the level of friction into account. The roll angle may be taken into account also or instead of the pitch angle, to prevent the remote operator from putting the vehicle into a possible roll situation, which may be difficult for the remote operator to perceive from outside the vehicle. The angles at which the vehicle may be permitted to be operated in a remote control mode of operation may be affected by the traction available to the vehicle wheels, so by taking the combination of both traction and angles into account, the vehicle can be kept under safe operating conditions.

The processing means may be configured to provide an output signal to cause the parking brake of the vehicle to be applied and the vehicle transmission to be put into park mode in dependence on the maximum speed value being determined to be zero. Thus, the vehicle can be placed in a safe, secure state if it has been necessary to bring the vehicle to a stop due.

This on its own may be considered as an invention in its own right, so according to another aspect, there is provided apparatus for controlling movement of a vehicle, the apparatus comprising processing means configured to: receive first signals from a receiving means in dependence on received transmitted signals from a remote control device indicating a requested motion of a vehicle; receive angle signals, from an angle sensing means, indicative of one or both of a roll angle and a pitch angle of the vehicle; determine a maximum speed value for the vehicle in dependence on one or both of the roll angle and the pitch angle; and provide an output signal for controlling speed of the vehicle based on the requested motion, wherein the output signal is limited dependent upon the maximum speed value. The processing means is configured to provide an output signal to cause the parking brake of the vehicle to be applied and the vehicle transmission to be put into park mode in dependence on the maximum speed value being determined to be zero.

According to this aspect, the maximum speed at which the vehicle can be operated in the remote control drive mode can be limited purely in dependence on the contours of the terrain, not necessarily also taking traction available to the vehicle into account, thereby ensuring that the vehicle can be stopped safely within a certain distance or time. Thus, the operator of the remote control can be confident that the vehicle will not be permitted to inadvertently travel at a speed that could compromise the safety of the vehicle and people within the vicinity of the vehicle, including the operator. Additionally, because the processing means is configured to provide an output signal to cause the parking brake of the vehicle to be applied and the vehicle transmission to be put into park mode in dependence on the maximum speed value being determined to be zero, the vehicle can be placed in a safe, secure state if it has been necessary to bring the vehicle to a stop.

The angle signals may be indicative both of absolute values of one or both of the roll angle and the pitch angle, and rates of change thereof. A more accurate determination of safe operating conditions and, therefore, safe operating speeds can be made by taking into account not only the current absolute values of the pitch and/or roll angles, but also how quickly they are changing.

The angle sensing means may comprise at least one sensor selected from the group comprising: a roll angle sensor; a pitch angle sensor; a vehicle inertial measurement unit (IMU); and suspension height sensors. Hence, the pitch and roll angles, as well as their rates of change, may be measured directly or indirectly.

In certain scenarios, the processing means may be configured to provide an output signal to prevent operation of the vehicle in a remote control driving mode, thereby only permitting the vehicle to be driven in manual mode until conditions change so that the maximum speed value is determined to be greater than zero. Thus, the vehicle can be held in a safe, secure state if it has been necessary to bring the vehicle to a stop. In certain scenarios, the user may be prevented from operating the vehicle in a remote control mode until the conditions have changed—for example by having moved the vehicle (in manual mode) to a different terrain where the traction is higher and/or the contours are less steep—and operation of the vehicle in remote control drive mode can be resumed safely. The same principle can be applied to situations where the vehicle has been prevented from setting off from rest in a remote control drive mode.

The processing means may comprise an electronic processor electrically coupled to an electronic memory device having instructions stored therein and the electronic processor may have an electrical input for receiving the first signals and the second signals.

According to another aspect of the invention, there is provided a system for controlling the movement of a vehicle comprising the apparatus according to any of the above described aspects, and a receiving means for receiving the transmitted signals from a remote control device via a wireless local area network.

According to yet another aspect, there is provided a vehicle comprising an apparatus or a system according to any of the above-described aspects wherein the speed of the vehicle is limited to a speed dependent on the maximum speed value.

According to an aspect of the invention, there is provided an apparatus as described above, wherein said processing means configured to: receive said first signals; receive said second signals; determine a maximum speed value for the vehicle; and provide an output signal for controlling speed of the vehicle, comprises: an electronic processor having an electrical input for receiving said first and second signals; and an electronic memory device electrically coupled to the electronic processor and having instructions stored therein; wherein the processor is configured to access the memory device and execute the instructions stored therein such that it is operable to determine a maximum speed value for the vehicle in dependence on the value of traction of the vehicle, and to provide an output signal for controlling speed of the vehicle based on the requested motion, wherein the output signal is limited dependent upon the maximum speed value.

According to another aspect, there is provided an apparatus as described above, wherein said processing means configured to: receive said first signals; receive said angle signals; determine a maximum speed value for the vehicle; and provide an output signal for controlling speed of the vehicle, comprises: an electronic processor having an electrical input for receiving said first signals and said angle signals; and an electronic memory device electrically coupled to the electronic processor and having instructions stored therein; wherein the processor is configured to access the memory device and execute the instructions stored therein such that it is operable to determine a maximum speed value for the vehicle in dependence on one or both of a roll angle and a pitch angle of the vehicle, and to provide an output signal for controlling speed of the vehicle based on the requested motion, wherein the output signal is limited dependent upon the maximum speed value.

There is further disclosed an apparatus for controlling movement of a vehicle, the apparatus comprising processing means configured to: receive first signals from a receiving means in dependence on received transmitted signals from a remote control device indicating a requested motion of a vehicle; receive one or more second signals indicative of a trailer being connected to the vehicle; and provide an output signal for controlling movement of the vehicle based on the requested motion, wherein the output signal is limited dependent on the one or more second signals.

When a trailer is attached to a vehicle, it may obscure certain of the vehicle's sensors—such as one or more of the parking sensors, radars, or cameras. Signals from those sensors may be useful in maintaining full control of the vehicle during a remote control mode of operation—for example as proximity sensors to prevent collisions with obstacles in the vicinity of the vehicle; signals from those proximity sensors being taken as inputs to a collision prevention system that will automatically bring the vehicle to a controlled stop if an obstacle is detected as being too close to the path of the vehicle. This is particularly significant in the case of reverse movements. Hence, if at least some of those sensors are not capable of operating at their full capabilities then the collision prevention system may not be relied upon to avoid such collisions. Moreover, a connected trailer would typically result in increased stopping distances for the vehicle. Thus, with a trailer attached, there is an increased chance of colliding with an obstacle when operating the vehicle in a remote control mode. Accordingly, by detecting the presence of a trailer connected to the vehicle, the remote control mode of operation may be limited (e.g. restricted) so as to reduce the risk of collision.

The output signal may be inhibited in dependence on the one or more second signals. Thus, in certain embodiments, operation in the remote control mode is fully prevented and the vehicle may only be moved by driving it in manual mode.

The output signal may be for limiting the speed of the vehicle to a maximum speed value. By limiting the maximum speed of the vehicle whilst in remote control mode with a trailer connected, the vehicle will have a reduced required braking distance, and will allow the operator a greater time to react to any potential collisions. Another way to limit the remote control mode of operation would be to prevent movements in reverse, since that is the direction in which the trailer may be obscuring the field of view of the relevant sensors.

The maximum speed value may be zero. This corresponds, in effect, to the limitation being a full prevention of operation in the remote control mode. The output signal may be for applying a braking force to the vehicle. Thus, if a trailer is detected as being connected, the vehicle brakes may be applied either to prevent move-off of the vehicle, or to bring the vehicle to a controlled stop if the presence of the trailer is only detected after the vehicle has begun to be moved under remote control operation.

Receiving the one or more second signals may comprise receiving a trailer connection signal from a trailer connection sensor. Receiving the trailer connection signal may comprise receiving a signal on the vehicle CAN bus indicative of an electrical connection between the trailer and the vehicle.

The trailer connection sensor may comprise one or more proximity sensors and receiving the trailer connection signal may comprise receiving a signal output in dependence on the one or more proximity sensors detecting the presence of an object at a set distance from the vehicle. For a given trailer and connection mechanism, the distance from the rear of the vehicle (the proximity sensor(s) at the rear of the vehicle) to the front of the trailer will be known. As such, if the proximity sensors detect an object at that known distance then it can be inferred that the given trailer is connected to the vehicle. The one or more proximity sensors may be selected from the group comprising: ultrasound sensors, radar sensors and optical sensors. It will be understood that any sensor or group of sensors that can be used to detect whether an object is at a particular distance from the vehicle may be employed. The set distance may be constant during movement of the vehicle. With a known trailer and a known connection mechanism, the connection of the trailer can be inferred when the vehicle is stationary. However, there is a risk of a false positive, in that there may just be another object such as an unconnected trailer or a wall, at that location. It would be inconvenient if an operator could not use the remote control mode to move the vehicle away from that obstacle simply because it was at a distance where it could have been taken to be a connected trailer. Thus, to avoid such false positives, in certain embodiments that movement is allowed under remote control operation—possibly in a limited capacity, such as away from the obstacle only, and/or at a slow speed—yet the signals from the proximity sensors continue to be monitored during that initial movement and if the distance to the object remains substantially constant, then it can be inferred that it is in fact connected to the vehicle (i.e. a trailer). Once it is determined that a trailer is connected, then operation in the remote control mode will typically be ended by bringing the vehicle to a controlled stop (i.e. by application of the vehicle brakes) and preventing any further remote control of the vehicle until the trailer has been disconnected. With this means of detecting the presence of an object connected to the rear of the vehicle, the remote control mode can be limited or inhibited even when the object is not a trailer per se; by way of example, another vehicle connected via a tow-rope.

According to another aspect of the invention, there is provided a method of controlling movement of a vehicle, the method comprising: receiving first signals from a receiving means in dependence on received transmitted signals from a remote control device indicating a requested motion of a vehicle; receiving second signals indicative of a value of traction of the vehicle; determining a maximum speed value for the vehicle in dependence on the value of traction of the vehicle; and providing an output signal for controlling speed of the vehicle based on the requested motion, wherein the output signal is limited dependent upon the maximum speed value. The value of traction of the vehicle is classified into discrete levels, and the maximum speed value is set at corresponding discrete levels in dependence on the level to which the value of traction is classified Determining a maximum speed value may comprise determining the value of traction from the second signals received from at least one vehicle sensor.

Determining the value of traction may comprise receiving steering force signals indicative of a steering rack force; receiving normal force signals indicative of a normal force at steerable wheels of the vehicle; determining a coefficient of friction between the steerable wheels and the ground in dependence on the steering force signals and the normal force signals; and providing an output signal dependent upon the coefficient of friction indicative of the value of traction of the vehicle.

The method may comprise determining, from the first signals or an additional proximity signal received from a proximity sensing means, a distance value indicative of a distance from a point on the vehicle to an obstacle; wherein determining the maximum speed value for the vehicle is in dependence on the value of traction of the vehicle and on the distance value.

The method may comprise determining, from additional angle signals received from an angle sensing means, one or both of a roll angle and a pitch angle of the vehicle; wherein determining the maximum speed value for the vehicle is in dependence on the value of traction of the vehicle and on one or both of the roll angle and the pitch angle.

According to another aspect of the invention, there is provided a method of controlling movement of a vehicle, the method comprising: receiving first signals from a receiving means in dependence on received transmitted signals from a remote control device indicating a requested motion of a vehicle; receiving angle signals, from an angle sensing means, indicative of one or both of a roll angle and a pitch angle of the vehicle; determining a maximum speed value for the vehicle in dependence on one or both of the roll angle and the pitch angle; providing an output signal for controlling speed of the vehicle based on the requested motion, wherein the output signal is limited dependent upon the maximum speed value; and providing an output signal to cause the parking brake of the vehicle to be applied and the vehicle transmission to be put into park mode in dependence on the maximum speed value being determined to be zero.

The angle signals may be indicative both of absolute values of one or both of the roll angle and the pitch angle, and rates of change thereof.

Providing an output signal may comprise providing an output signal to at least one of a brake controller and a powertrain controller, to cause the speed of the vehicle to be limited to a speed corresponding to the maximum speed value.

There is further disclosed a method of controlling movement of a vehicle, the method comprising: receiving first signals from a receiving means in dependence on received transmitted signals from a remote control device indicating a requested motion of a vehicle; receiving one or more second signals indicative of a trailer being connected to the vehicle; and providing an output signal for controlling movement of the vehicle based on the requested motion, wherein the output signal is limited dependent on the one or more second signals.

Providing an output signal may comprise providing an output signal to at least one of: a powertrain controller, a transmission controller, a brake controller, and a steering controller to cause the vehicle to move in accordance with the requested motion. The output signal may be for limiting the speed of the vehicle to a maximum speed value. The maximum speed value may be zero.

According to even yet another aspect, there is provided a computer program which, when executed by a processor, is arranged to perform a method as described above. Optionally, the computer program is stored on a computer-readable medium.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described by way of example only, with reference to the accompanying figures, in which.

DETAILED DESCRIPTION

Figure 1:
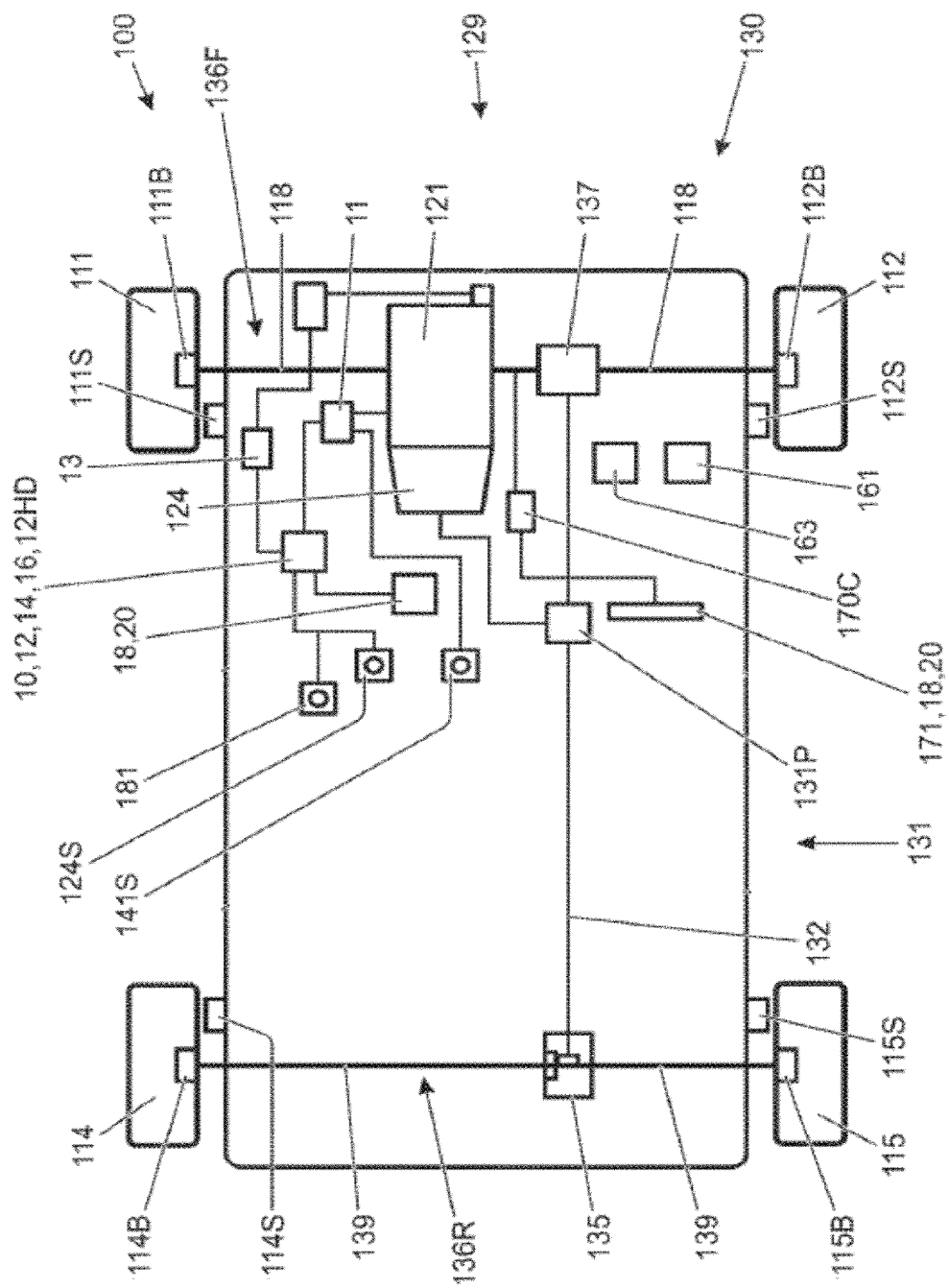
FIG. 1 shows a schematic view of a vehicle suitable for use with a remote control drive system according to the invention.

The figures illustrate an apparatus 101 for controlling movement of a vehicle 100, the apparatus comprising processing means 10 configured to: receive 501 first signals from a receiving means 202 in dependence on received transmitted signals from a remote control device 200 indicating a requested motion of a vehicle 100; receive 503 second signals indicative of a value of traction of the vehicle; determine 505 a maximum speed value for the vehicle in dependence on the value of traction of the vehicle; and provide 507 an output signal for controlling speed of the vehicle 100 based on the requested motion, wherein the output signal is limited dependent upon the maximum speed value.

In this manner, the maximum speed at which the vehicle can be operated in the remote control drive mode can be limited in dependence on the traction available to the vehicle, thereby ensuring that the vehicle can be stopped within a certain distance or time. Thus, the operator of the remote control can be confident that the vehicle will not be permitted to inadvertently travel at a speed that could compromise the safety of the vehicle and people within the vicinity of the vehicle, including the operator.

The figures also illustrate an apparatus 101 for controlling movement of a vehicle 100, the apparatus comprising processing means 10 configured to: receive 601 first signals from a receiving means 202 in dependence on received transmitted signals from a remote control device 200 indicating a requested motion of a vehicle 100; receive 603 angle signals, from an angle sensing means, indicative of one or both of a roll angle and a pitch angle of the vehicle; determine 605 a maximum speed value for the vehicle in dependence on one or both of the roll angle and the pitch angle; and provide 607 an output signal for controlling speed of the vehicle 100 based on the requested motion, wherein the output signal is limited dependent upon the maximum speed value.

Accordingly, the maximum speed at which the vehicle can be operated in the remote control drive mode can be limited purely in dependence on the contours of the terrain, not necessarily also taking traction available to the vehicle into account, thereby ensuring that the vehicle can be stopped safely within a certain distance or time. Thus, the operator of the remote control can be confident that the vehicle will not be permitted to inadvertently travel at a speed that could compromise the safety of the vehicle and people within the vicinity of the vehicle, including the operator.

In addition, the figures illustrate a method of controlling movement of a vehicle 100, the method comprising: receiving 501 first signals from a receiving means 202 in dependence on received transmitted signals from a remote control device 200 indicating a requested motion of a vehicle 100; receiving 503 second signals indicative of a value of traction of the vehicle; determining 505 a maximum speed value for the vehicle in dependence on the value of traction of the vehicle; and providing 507 an output signal for controlling speed of the vehicle 100 based on the requested motion, wherein the output signal is limited dependent upon the maximum speed value.

The figures further illustrate a method of controlling movement of a vehicle 100, the method comprising: receiving 601 first signals from a receiving means 202 in dependence on received transmitted signals from a remote control device 200 indicating a requested motion of a vehicle 100; receiving 603 angle signals, from an angle sensing means, indicative of one or both of a roll angle and a pitch angle of the vehicle; determining 605 a maximum speed value for the vehicle in dependence on one or both of the roll angle and the pitch angle; and providing 607 an output signal for controlling speed of the vehicle 100 based on the requested motion, wherein the output signal is limited dependent upon the maximum speed value.

The figures further illustrate an apparatus 101 for controlling movement of a vehicle 100, the apparatus comprising processing means 10 configured to: receive first signals from a receiving means 202 in dependence on received transmitted signals from a remote control device 200 indicating a requested motion of a vehicle 100; receive one or more second signals indicative of a trailer 300 being connected to the vehicle 100; and provide an output signal for controlling movement of the vehicle 100 based on the requested motion. The output signal is limited dependent on the one or more second signals.

The figures also illustrate a method of controlling movement of a vehicle 100, the method comprising: receiving first signals from a receiving means 202 in dependence on received transmitted signals from a remote control device 200 indicating a requested motion of a vehicle 100; receiving one or more second signals indicative of a trailer 300 being connected to the vehicle 100; and providing an output signal for controlling movement of the vehicle 100 based on the requested motion. The output signal is limited dependent on the one or more second signals.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission. Moreover, embodiments of the invention are suitable for use in vehicles having other types of powertrain, such as battery electric vehicles, fuel cell powered vehicles, and hybrids.

In the embodiment of FIG. 1 the transmission 124 may be set to one of a plurality of transmission operating modes, being a park mode P, a reverse mode R, a neutral mode N, a drive mode D or a sport mode S, by means of a transmission mode selector dial 124S. The selector dial 124S provides an output signal to a powertrain controller 11 in response to which the powertrain controller 11 causes the transmission 124 to operate in accordance with the selected transmission mode. Accordingly, in this embodiment a transmission controller (not shown) is incorporated into the powertrain controller 11. However, in other embodiments the transmission controller may be a separate element in operable communication with the controller 10.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. The front wheels 111, 112 in combination with the front drive shafts 118 and front differential 137 may be referred to as a front axle 136F. The rear wheels 114, 115 in combination with rear drive shafts 139 and rear differential 135 may be referred to as a rear axle 136R.

The wheels 111, 112, 114, 115 each have a respective brake 111B, 112B, 114B, 115B. Respective speed sensors 111S, 112S, 114S, 115S are associated with each wheel 111, 112, 114, 115 of the vehicle 100. The sensors 111S, 112S, 114S, 115S are mounted to the vehicle 100 and arranged to measure a speed of the corresponding wheel.

Embodiments of the invention are suitable for use with vehicles in which the transmission is arranged to drive only a pair of front wheels or only a pair of rear wheels (i.e. front wheel drive vehicles or rear wheel drive vehicles) or selectable two-wheel drive/four-wheel drive vehicles. In the embodiment of FIG. 1 the transmission 124 is releasably connectable to the auxiliary driveline portion 131 by means of a power transfer unit (PTU) 131P, allowing operation in a two-wheel drive mode or a four-wheel drive mode. It is to be understood that embodiments of the invention may be suitable for vehicles having more than four wheels or where only two wheels are driven, for example two wheels of a three-wheeled vehicle or four-wheeled vehicle or a vehicle with more than four wheels.

Figure 3:
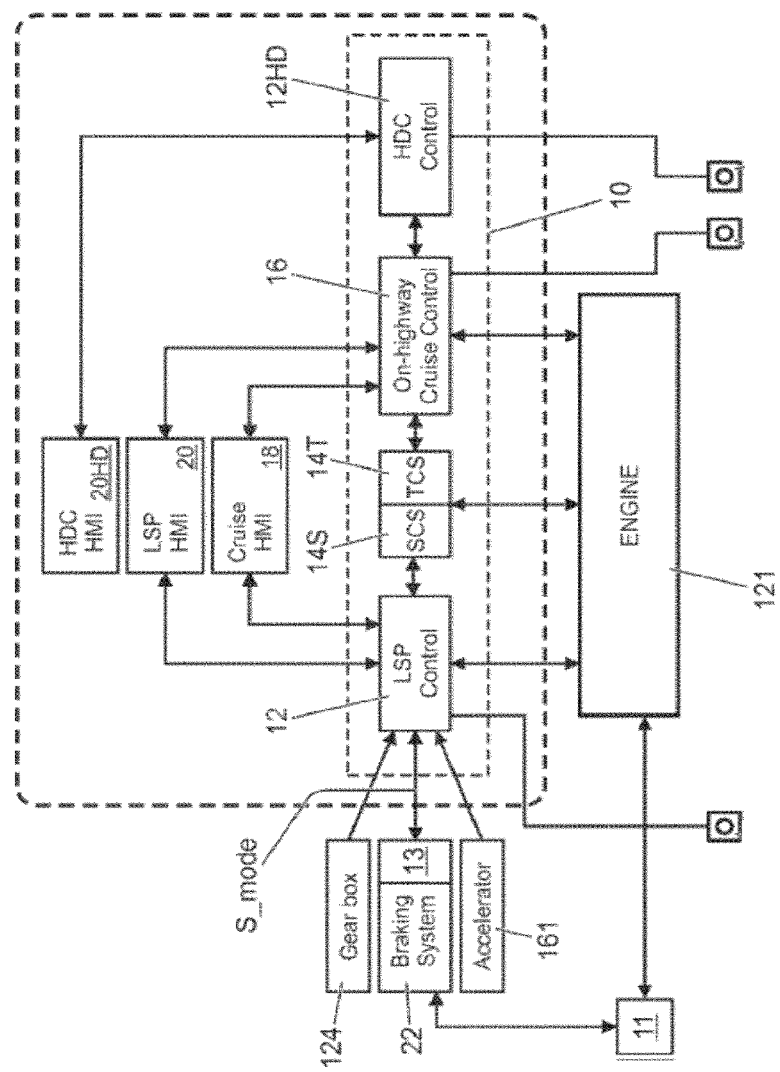
FIG. 3 shows a block diagram of a controller for controlling movement of a vehicle.

A control system for the vehicle 100 includes a central controller 10, referred to as a vehicle control unit (VCU) 10, the powertrain controller 11, a brake controller 13 and a steering controller 170C. The brake controller 13 is an anti-lock braking system (ABS) controller 13 and forms part of a braking system 22 (FIG. 3). The VCU 10 receives and outputs a plurality of signals to and from various sensors 1000 and subsystems (not shown) provided on the vehicle. The VCU 10 includes a low-speed progress (LSP) control system 12 shown in FIG. 3, a stability control system (SCS) 14S, a traction control system (TCS) 14T, a cruise control system 16 and a Hill Descent Control (HDC) system 12HD. The SCS 14S improves stability of the vehicle 100 by detecting and managing loss of traction when cornering. When a reduction in steering control is detected, the SCS 14S is configured automatically to command the brake controller 13 to apply one or more brakes 111B, 112B, 114B, 115B of the vehicle 100 to help to steer the vehicle 100 in the direction the user wishes to travel. If excessive wheel spin is detected, the TCS 14S is configured to reduce wheel spin by application of brake force in combination with a reduction in powertrain drive torque. In the embodiment shown the SCS 14S and TCS 14T are implemented by the VCU 10. In some alternative embodiments the SCS 14S and/or TCS 14T may be implemented by the brake controller 13. Further alternatively, the SCS 14S and/or TCS 14T may be implemented by one or more further controllers.

Similarly, one or more of the controllers 10, 11, 13, 170C may be implemented in software run on a respective one or more computing devices such as one or more electronic control units (ECUs). In some embodiments two or more of the controllers 10, 11, 13, 170C may be implemented in software run on one or more common computing devices. Two or more controllers 10, 11, 13, 170C may be implemented in software in the form of a combined software module.

It is to be understood that one or more computing devices may be configured to permit a plurality of software modules to be run on the same computing device without interference between the modules. For example the computing devices may be configured to allow the modules to run such that if execution of software code embodying a first controller terminates erroneously, or the computing device enters an unintended endless loop in respect of one of the modules, it does not affect execution of software code comprised by a software module embodying a second controller.

It is to be understood that one or more of the controllers 10, 11, 13, 170C may be configured to have substantially no single point failure modes, i.e. one or more of the controllers may have dual or multiple redundancy. It is to be understood that robust partitioning technologies are known for enabling redundancy to be introduced, such as technologies enabling isolation of software modules being executed on a common computing device. It is to be understood that the common computing device will typically comprise at least one microprocessor, optionally a plurality of processors, which may operate in parallel with one another. In some embodiments a monitor may be provided, the monitor being optionally implemented in software code and configured to raise an alert in the event a software module is determined to have malfunctioned.

The SCS 14S, TCS 14T, ABS controller 22C and HDC system 12HD provide outputs indicative of, for example, SCS activity, TCS activity and ABS activity including brake interventions on individual wheels and engine torque requests from the VCU 10 to the engine 121, for example in the event a wheel slip event occurs. Each of the aforementioned events indicate that a wheel slip event has occurred. Other vehicle sub-systems such as a roll stability control system or the like may also be present.

Figure 4:
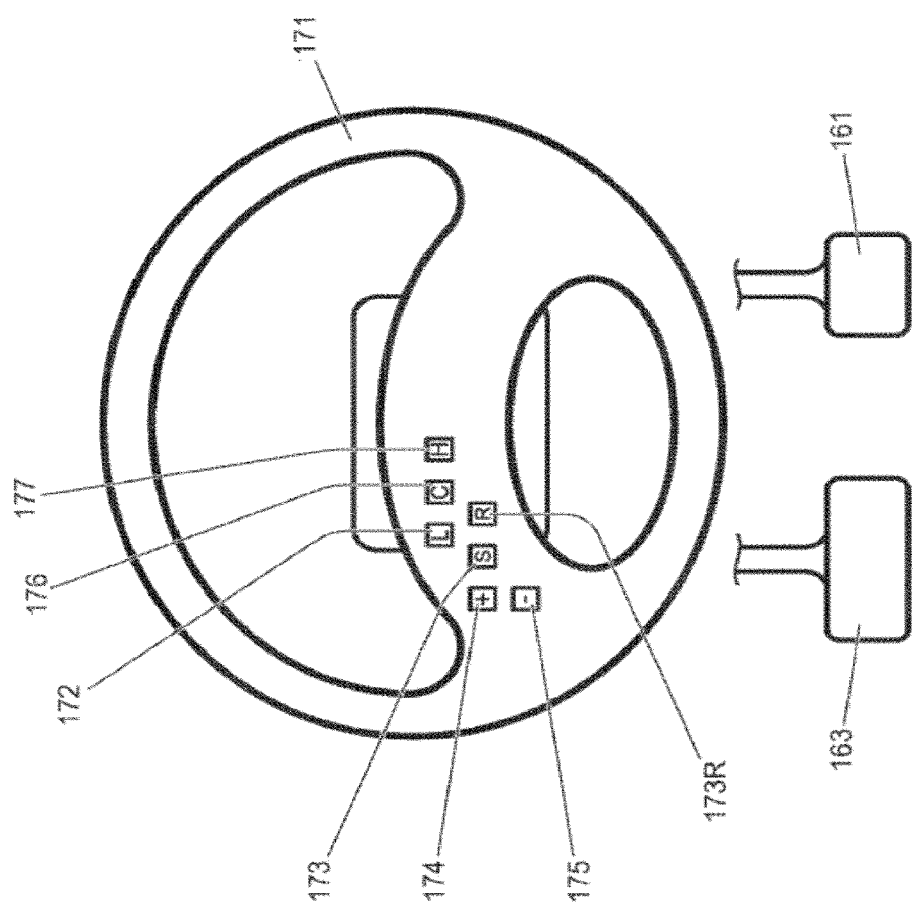
FIG. 4 shows a schematic view of main input devices within the vehicle.

As noted above, the vehicle 100 includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner Cruise control system input controls are mounted to a steering wheel 171 (FIG. 4). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a cruise control increase set speed button, in the form of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following a driver over-ride intervention. It is to be understood that known on-highway cruise control systems including the present system 16 are configured so that, in the event that the user depresses the brake or, in the case of vehicles with a manual transmission, a clutch pedal, the cruise control function is cancelled and the vehicle 100 reverts to a manual mode of operation which requires accelerator pedal input by a user in order to maintain vehicle speed. In addition, detection of a wheel slip event, as may be initiated by a loss of traction, also has the effect of cancelling the cruise control function. Speed control by the system 16 is resumed if the driver subsequently depresses the resume button 173R.

The LSP control system 12 also provides a speed-based control system for the user, which enables the user to select a very low target speed at which the vehicle can progress without any pedal inputs being required by the user. Low-speed speed control (or progress control) functionality is not provided by the on-highway cruise control system 16 which operates only at speeds above 25 kph.

The LSP control system 12 is activated by means of a LSP control system selector button 172 mounted on the steering wheel 171. The system 12 is operable to apply selective powertrain, traction control and braking actions to one or more wheels of the vehicle 100, collectively or individually, to maintain the vehicle 100 at the desired speed. It is to be understood that in some embodiments the LSP control system selector button 172 may be mounted in a location other than on the steering wheel 171, such as in a dashboard or any other suitable location.

The LSP control system 12 is configured to allow a user to input a desired value of set-speed parameter, user_set-speed to the LSP control system 12 via a low-speed progress control HMI (LSP HMI) 20 (FIG. 1, FIG. 3) which shares certain input buttons 173-175 with the cruise control system 16 and HDC control system 12HD. Provided the vehicle speed is within the allowable range of operation of the LSP control system (which is the range from 2 to 30 kph in the present embodiment although other ranges are also useful) the LSP control system 12 controls vehicle speed in accordance with the value of user_set-speed by setting a parameter LSP_set-speed equal to the value of user_set-speed unless the system 12 determines that a lower value of LSP_set-speed is required as discussed in more detail below with respect to FIG. 5. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

The LSP control HMI 20 is provided in the vehicle cabin so as to be readily accessible to the user. The user of the vehicle 100 is able to input to the LSP control system 12, via the LSP HMI 20, an indication of the speed at which the user desires the vehicle to travel, user_set-speed, by means of the 'set-speed' button 173 and the '+'/'−' buttons 174, 175 in a similar manner to the cruise control system 16. The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20.

The HDC system 12HD is configured to limit vehicle speed when descending a gradient. When the HDC system 12HD is active, the system 12HD controls the braking system 22 (via brake controller 13) in order to limit vehicle speed to a value corresponding to that of a HDC set-speed parameter HDC_set-speed which may be set by a user. The HDC set-speed may also be referred to as an HDC target speed. Provided the user does not override the HDC system by depressing the accelerator pedal when the HDC system 12HD is active, the HDC system 12HD controls the braking system 22 to prevent vehicle speed from exceeding the value of HDC_set-speed. In the present embodiment the HDC system 12HD is not operable to apply positive drive torque. Rather, the HDC system 12HD is only operable to apply negative brake torque by means of the braking system 22.

A HDC system HMI 20HD is provided by means of which a user may control the HDC system 12HD, including setting the value of HDC_set-speed. An HDC system selector button 177 is provided on the steering wheel 171 by means of which a user may activate the HDC system 12HD to control vehicle speed.

As noted above, the HDC system 12HD is operable to allow a user to set a value of HDC set-speed parameter HDC_set-speed and to adjust the value of HDC_set-speed using the same controls as the cruise control system 16 and LSP control system 12. Thus, in the present embodiment, when the HDC system 12HD is controlling vehicle speed, the HDC system set-speed may be increased, decreased or set to an instant speed of the vehicle in a similar manner to the set-speed of the cruise control system 16 and LSP control system 12, using the same control buttons 173, 173R, 174, 175. The HDC system 12HD is operable to allow the value of HDC_set-speed to be set to any value in the range from 2-30 kph.

It is to be understood that the VCU 10 is configured to implement a Terrain Response (TR) (RTM) System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response modes, or control modes. In the embodiment of FIG. 1 four driving modes are provided: an 'on-highway' driving mode or 'special programs off' (SPO) mode suitable for driving on a relatively hard, smooth driving surface where a relatively high surface coefficient of friction exists between the driving surface and wheels of the vehicle; a 'sand' driving mode (SAND) suitable for driving over sandy terrain; a 'grass, gravel or snow' (GGS) driving mode suitable for driving over grass, gravel or snow, a 'rock crawl' (RC) driving mode suitable for driving slowly over a rocky surface; and a 'mud and ruts' (MR) driving mode suitable for driving in muddy, rutted terrain. Other driving modes may be provided in addition or instead.

The sensors on the vehicle 100 include sensors which provide continuous sensor outputs to the VCU 10, including wheel speed sensors 111S, 112S, 114S, 115S, as mentioned previously and as shown in FIG. 1, and other sensors (not shown) such as an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering rack sensor, a steering wheel speed sensor, a gradient sensor (or gradient estimator), a lateral acceleration sensor which may be part of the SCS 14S, a brake pedal position sensor, a brake pressure sensor, an accelerator pedal position sensor, longitudinal, lateral and vertical motion sensors, an inertial measurement unit (IMU), and water detection sensors forming part of a vehicle wading assistance system (not shown). In other embodiments, only a selection of the aforementioned sensors may be used. Other sensors may be useful in addition or instead in some embodiments. The collection of vehicle sensors is depicted schematically in FIG. 7 as vehicle sensors 1000.

The VCU 10 also receives a signal from the steering controller 170C. The steering controller 170C is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

Figure 2:
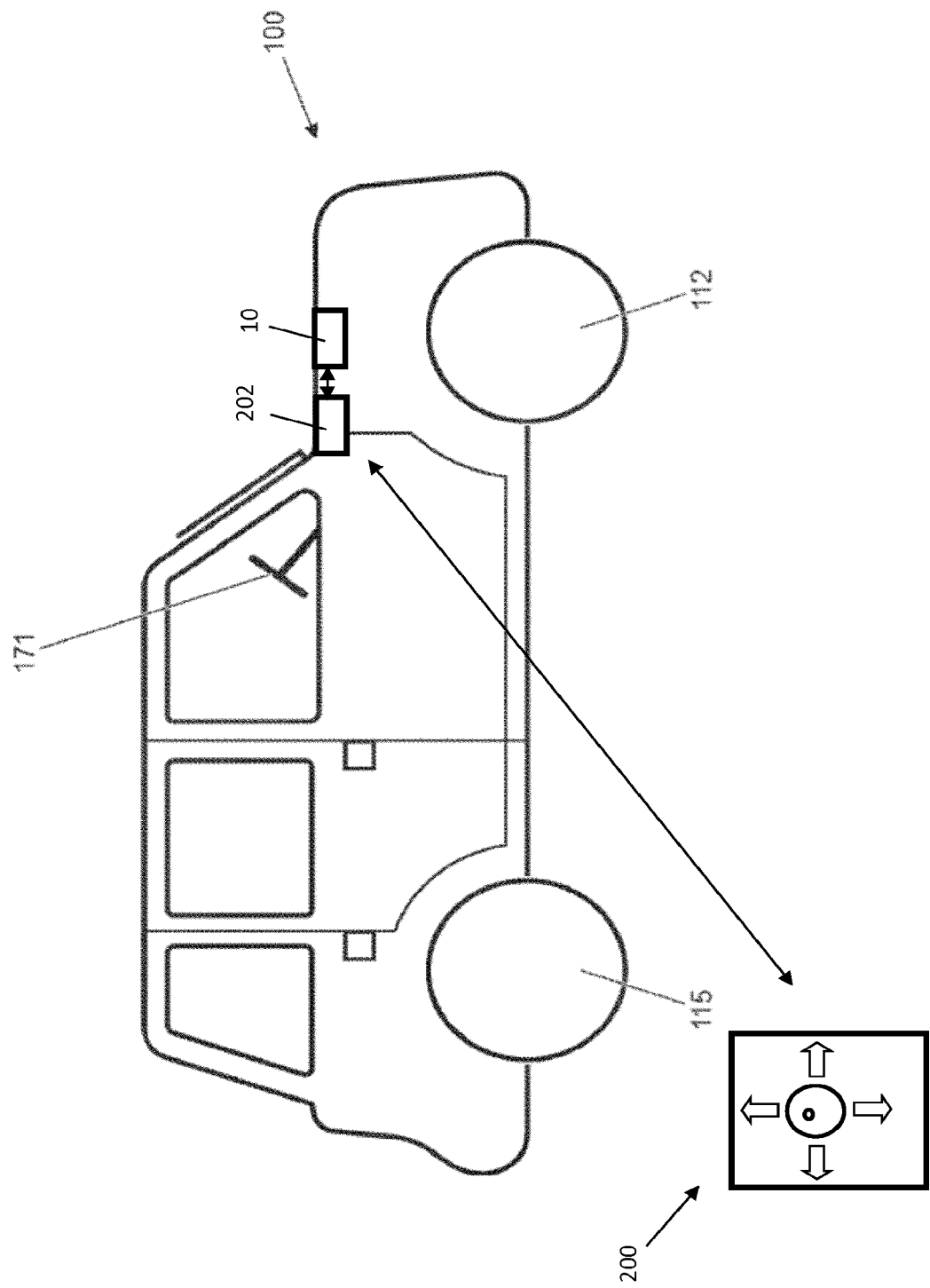
FIG. 2 shows a vehicle and an associated remote control device for use in controlling movement of the vehicle.
Figure 7:
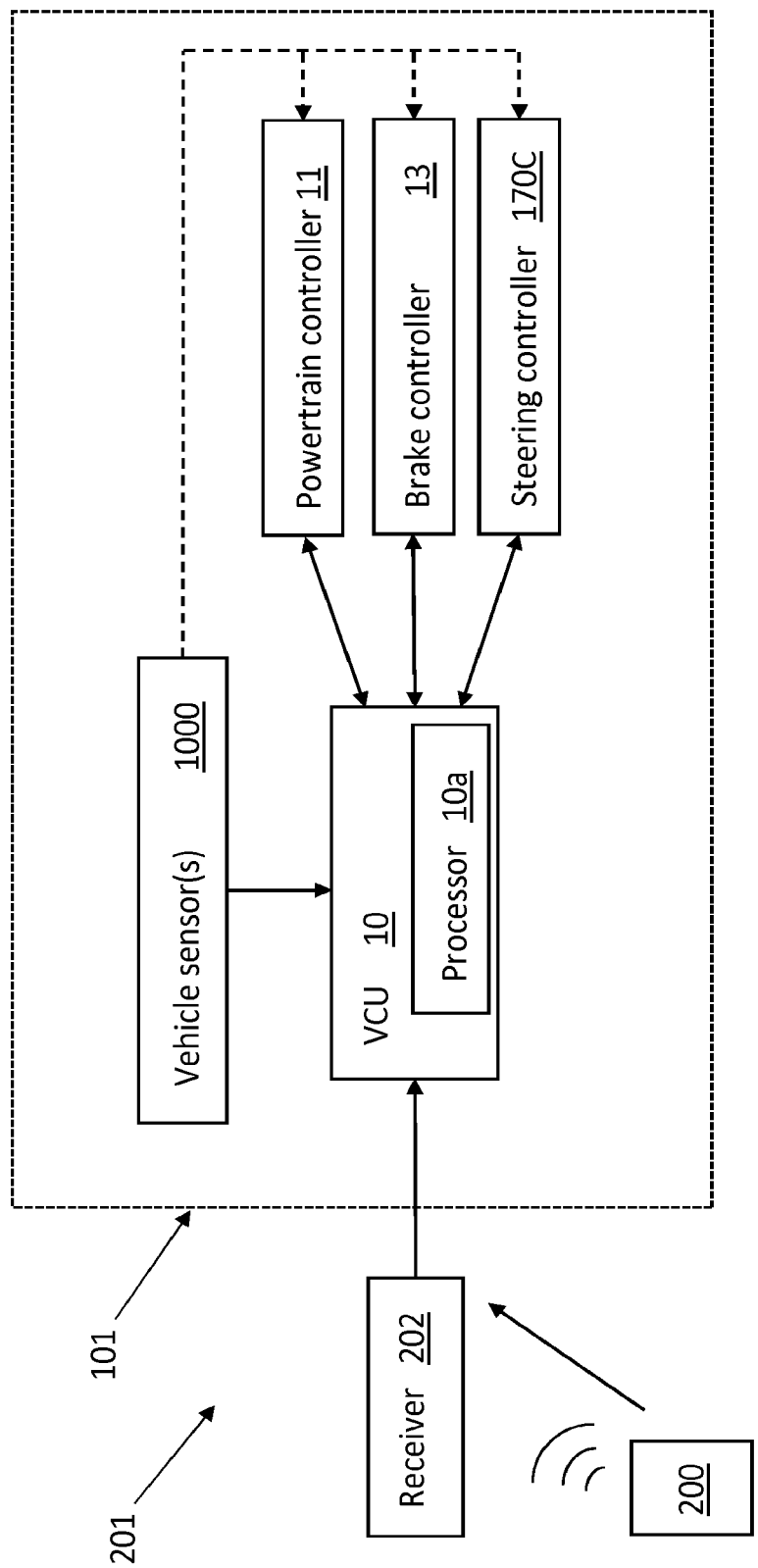
FIG. 7 shows a schematic view of a system and an apparatus for controlling movement of a vehicle according to the invention.

As shown in FIGS. 2 and 7, the controller 10 is configured to receive signals from a receiving means 202 arranged to receive transmitted signals from a remote control device 200 indicating a requested motion of a vehicle.

An example of a system 201 incorporating the apparatus 101 is shown in FIG. 7. The system includes the apparatus of FIG. 3 and a receiving means 202 in the form of a radio unit. The radio unit 202 may comprise a receiver and a transmitter or a transceiver configured to receive radio signals transmitted from a remote control device 200 and transmit signals to the remote control device 200. The radio unit 202 and the remote control device 200 may be arranged to provide a wireless local area network, via which two-way communication may take place between the radio unit 202 and the remote control device 200. For example, the radio unit 202 may be arranged to communicate by WiFi with the remote control device 200. In alternative embodiments other radio communication standards may be used for the communication. In one example, communication between the radio unit 202 and the remote control device 200 is provided via Bluetooth.

The remote control device 200 may be a portable device, which may be carried and used by a person outside of the vehicle 100. In an example, the remote control device 200 comprises a mobile phone (or cell phone) having an application to enable the person to provide manual inputs to request movement of the vehicle 100. For example, the manual inputs may include an indication of required throttle and braking, or a required speed, as well as required direction of travel (steering). The remote control device 200 is arranged to include data, indicative of the received user inputs, within the signals transmitted to the radio unit 202. The radio unit 202 is arranged to extract this data and provide the data to the controller 10.

The system enables a person to control movements of the vehicle 100 by remote control by providing user inputs to the remote control device 200. To enable such remote control, a two-way communication link is firstly established between the remote control device 200 and the radio unit 202. With the link established, the remote control device 200 may then be used to indicate to the controller 10 that a remote control mode enabling remote control movement of the vehicle 100 is requested. The controller 10 may determine whether one or more criteria are met before enabling remote control of the vehicle. For example, the controller 10 may determine whether a smart key (not shown) is present within the vehicle 100 and if it is, then remote control movement may be disabled or the maximum allowed speed of the vehicle may be set at zero.

With the communication link established, a user of the remote control device 200 is then able to provide manual inputs to the remote control device 200 to request and control movement of the vehicle, including an increase or decrease in speed or power, an increase or decrease in braking, gear selection, and direction of travel (steering). The remote control device 200 may generate data including information defining the requested movement, which is then transmitted to the radio unit 202 via the communication link.

In order to ensure safe operation when in a remote control drive mode, the maximum speed at which the vehicle can be operated in the remote control drive mode can be limited, thereby ensuring that the vehicle can be stopped within a certain distance or time. In certain embodiments, described more fully below, the maximum speed may be determined in dependence on the traction available to the vehicle.

A metric, the 'value of traction' of the vehicle is a measure of the amount of traction available at the driven wheels of the vehicle, and is derived from the coefficient of friction, $\mu$, between the respective tyres of the driven wheels and the surface on which they are in contact (the 'ground'). The maximum speed of the vehicle, when in remote control drive mode, is limited in dependence on the value of traction of the vehicle. If the coefficient of friction, $\mu$, is determined to be of different values for different wheels, then the value of traction for the vehicle may be taken as an average of those values, or the smallest of those values so that the vehicle speed is limited conservatively.

Alternatively or in addition, the maximum speed may be determined in dependence on a roll angle and/or a pitch angle of the vehicle.

The radio unit 202 determines the data defining the movement requested by the remote control device 200 and provides the data to the controller 10. The controller 10 provides output signals to the power steering controller 170C, the brake controller 13 and the powertrain controller 11 (incorporating the transmission controller) in dependence of the received data, and thus the user is able to operate the vehicle 100 remotely. However, the output signal provided to the brake controller 13 and the powertrain controller 11 may also be dependent upon the maximum speed value mentioned above. Specifically, whatever the speed of vehicle is requested by the remote control device 200, the controller 10 provides output signals to the brake controller 13 and/or the powertrain controller 11 to adjust the speed of the vehicle 100 to be no more than a speed corresponding to the maximum speed value. That is, the speed of the vehicle is limited to be no more than a speed corresponding to the maximum speed value. For example, where the data from the remote control device 202 relates to a user request for increased engine power and/or decreased braking that could increase the speed to 3 kilometres per hour, and the maximum speed value corresponds to 1 kilometre per hour, the controller 10 provides output signals to the brakes and powertrain to cause a speed of only 1 kilometre per hour. As well as limiting the maximum permissible speed according to the traction available, other requests from the remote control device 202 may likewise be limited according to the available traction. By way of example, a request for acceleration may be limited according to the conditions, with an acceleration profile being a function of the traction available: e.g. a relatively steep acceleration profile being followed under high traction conditions, down to a shallow acceleration profile being followed under low traction conditions. Optionally, discrete acceleration profiles may be provided corresponding to the discrete classifications for the value of traction of the vehicle. It is possible that the rates of steering may also be adjusted or limited according to the level of traction available.

In some instances, the speed requested by the remote control device 200 may be unchanged over a period of time, but the determined maximum speed value may become smaller than the current speed of the vehicle and as a result the output signals to the powertrain controller 11 and/or brake controller 13 may be adjusted to reduce the speed of the vehicle so that it corresponds to the maximum speed value.

The maximum available speed for the vehicle in remote control drive mode can be restricted in a simple manner according to which of three levels of traction the current conditions meet. So, for particularly slippery conditions, such as for a value of traction corresponding to a low' coefficient of friction in the range of 0.1 to 0.40, the vehicle may be prevented from operating in a remote control drive mode—i.e. the vehicle speed may be restricted to a maximum speed of 0 kph. For conditions in which a high level of grip is available, such as for a value of traction corresponding to a 'high' coefficient of friction in the range of 0.61 to 1.0, the vehicle may be operated up to the full available speed in a remote control drive mode—typically 6 kph. For conditions between these extremes, where only a mid-level of grip is available, here being a value of traction corresponding to a 'medium' coefficient of friction in the range of 0.41 to 0.60, the vehicle speed may be restricted accordingly. By way of example, the maximum speed at which the vehicle may be operated may be limited to 3 kph.

As such, if the operator attempts to request faster movement, that will be prevented. In certain embodiments, the low, medium and high coefficient of friction classifications may correspond to corresponding low, medium and high maximum speeds permissible in remote control drive mode; i.e. rather than preventing movements in low friction conditions, permitting movements of up to say 2 kph, with speeds up to 4 kph permitted when there is a medium friction classification, and up to 6 kph allowed in high friction conditions, as with the above example. In other embodiments, the level of traction may be divided into more or less than three classifications, with a corresponding number of threshold values. Optionally, discrete acceleration profiles may be provided corresponding to the discrete classifications for the value of traction of the vehicle.

In certain embodiments, the contours of the terrain may be taken into account too, to ensure that the vehicle 100 is kept under control. Angle signals, from an angle sensing means, indicative of one or both of a roll angle and a pitch angle of the vehicle, are communicated to the controller 10 for determining a maximum speed value for the vehicle in dependence on one or both of a roll angle and a pitch angle of the vehicle 100. The angle signals may be indicative both of absolute values of one or both of the roll angle and the pitch angle, and rates of change thereof. A more accurate determination of safe operating conditions and, therefore, safe operating speeds can be made by taking into account not only the current absolute values of the pitch and/or roll angles, but also how quickly they are changing.

The angle sensing means may comprise at least one sensor selected from the group comprising: a roll angle sensor; a pitch angle sensor; a vehicle inertial measurement unit (IMU); and suspension height sensors. Hence, the pitch and roll angles, as well as their rates of change, may be measured directly or indirectly.

For example, the maximum allowable vehicle speed may be adjusted in conjunction with the level of traction available and, optionally, with the proximity of obstacles, inversely proportional to the steepness of the gradient. In other words, if a remote operator requests a maximum 6 kph speed to climb or descend, then the processing means will adjust the actual vehicle speed by taking the pitch angle (and, optionally, the level of traction) into account. The roll angle may be taken into account also or instead of the pitch angle, to prevent the remote operator from putting the vehicle into a possible roll situation, which may be difficult for the remote operator to perceive from outside the vehicle. The angles at which the vehicle may be permitted to be operated in a remote control mode of operation may be affected by the traction available to the vehicle wheels, so by taking the combination of both traction and angles into account, the vehicle can be kept under safe operating conditions.

Signals output from certain types of sensors may be received and processed at a sub-modular level prior to onward transmission to the VCU 10. For example, signals from any or all sensors that may be indicative of the roll angle of the vehicle may be processed at a roll control module (e.g. a dedicated processor within the aforementioned roll stability control system) to determine an instantaneous roll angle and/or a rate of change thereof. Analogously, signals from any or all sensors that may be indicative of the pitch angle of the vehicle may be processed at a pitch control module (which may itself be part of the SCS or the HDC system 12HD for example) to determine an instantaneous pitch angle and/or a rate of change thereof. This is shown illustratively in FIG. 7, in which the dashed arrows from the vehicle sensors 1000 to the respective vehicle controllers 11, 13 and 170C depict optional connections for communicating data from the sensors 1000 to the respective controllers for onward communication to the central controller 10. Suitable sensors would include: a roll angle sensor; a pitch angle sensor; a vehicle inertial measurement unit (IMU); and suspension height sensors. The roll and pitch angle data determined at the respective roll and pitch control modules may be output to the VCU, where it may be used in conjunction with other inputs, such as the steering angle, vehicle speed and/or acceleration and vehicle traction, to determine an appropriate safe maximum speed for operation of the vehicle in a remote control mode in accordance with the conditions. Thus, the determination of the value of traction and/or of the pitch/roll angles may be carried out in respective separate elements to the central controller 10 and be communicated to the central controller in that form, ready for use in limiting the speed at which the vehicle can be operated, or the central controller 10 may receive raw data from the vehicle sensors 1000 and determine from that data a value of traction and/or of the pitch/roll angles of the vehicle. Optionally, the central controller 10 may combine that raw data from the sensors 1000 with other data to determine the value of traction more holistically.

In some embodiments, the distance of the vehicle 100 to an obstacle may be taken into account in the determination of the maximum speed. The distance between the vehicle and an obstacle may be determined on the basis of signals from a proximity sensing means in the form of one or more proximity sensors (not shown) on the vehicle, such as sensors that are known for use to assist parking of the vehicle. The proximity sensors may comprise ultrasonic proximity sensors but alternatively may be electromagnetic proximity sensors. Such sensors are known to be provided on vehicles to assist a driver when parking. Each of the proximity sensors may be arranged to provide sensor signals to the controller 10 indicative of a distance from the sensor to the obstacle nearest to that sensor. The controller 10 may be configured to process the signals from the sensors by performing sensor fusion (or multi sensor data fusion) to obtain a more accurate indication of the distance from the vehicle 100 to the nearest obstacle to the vehicle. That is, data received from the sensors may be combined so that the resulting indication of distance has less uncertainty than it would have if the data from each sensor were used individually.

Hence, the proximity of nearby obstacles may be taken as an additional factor for determining the maximum speed at which the vehicle should be allowed to travel, to ensure that the vehicle will be able to stop in advance of a collision with such an obstacle. The proximity sensing means may also be capable of determining a relative closing speed of the vehicle and the obstacle. In this way, movement of obstacles, such as people, animals or other vehicles, may be accounted for in the calculations and the determination of an appropriate maximum speed for the conditions which will ensure that the vehicle can be stopped in advance of a collision.

The sensing means may also comprise one or more cameras located within the vehicle 100 that are configured to provide a signal to the controller 10 indicative of a distance to a nearest obstacle.

By virtue of the fact that such proximity sensors may be used as inputs to a collision detection system during a remote control mode of operation, if there is a risk that one or more of these sensors may be compromised by having its field of view at least partially obscured, then that presents a risk to the vehicle and people in the vicinity. Accordingly, the invention addresses this problem by at least limiting—and preferably totally inhibiting—the functionality of the remote control operation if a trailer is detected as being connected to the vehicle.

There are several ways in which that determination can be made. Typically, a trailer is connected both mechanically and electrically to the vehicle. A mechanical connection may be made through a tow-bar. An electrical connection may be made via connection of an electrical cable between the trailer and a connector on the vehicle, for example to provide electrical signals and power to operate lights on the trailer. The detection of the trailer can thus be made on the basis of a sensor to detect the mechanical connection or a sensor to detect the connection of the electrical cable or a combination thereof. That latter detection of the electrical connection may be via a sensor at the connector or may be in response to a trailer connection signal on the CAN bus.

Another way to make the determination is through the use of one or more proximity sensors to detect the presence of an object at a set distance from the vehicle. For a given trailer and connection mechanism, the distance from the rear of the vehicle (the proximity sensor(s) at the rear of the vehicle) to the front of the trailer will be known. As such, if the proximity sensors detect an object at that known distance then it can be inferred that the given trailer is connected to the vehicle. The level of confidence in the determination can be improved by factoring in movement of the vehicle. Thus, if the gap remains substantially constant while the vehicle is moving, then it can be more reliably inferred that the object is moving with the vehicle and is therefore connected to it.

These may be the very same proximity sensors as would be used as inputs to a collision detection system during a remote control mode of operation. Alternatively, the proximity sensors for detecting the trailer or a sub-set or an overlapping set of proximity sensors, in which case it may be advantageous for the fields of view of the respective sets of proximity sensors to at least partially overlap to be confident that any object obscuring the collision-detecting proximity sensors is picked up by the trailer-detecting proximity sensors.

In certain embodiments, determination of whether or not a trailer is connected to the vehicle may be made with the benefit of shape recognition software and a comparison between known or expected shapes characteristic of a trailer and the signals output by the trailer-detecting proximity sensors. This may be particularly applicable where the proximity sensors include a camera.

Figure 9:
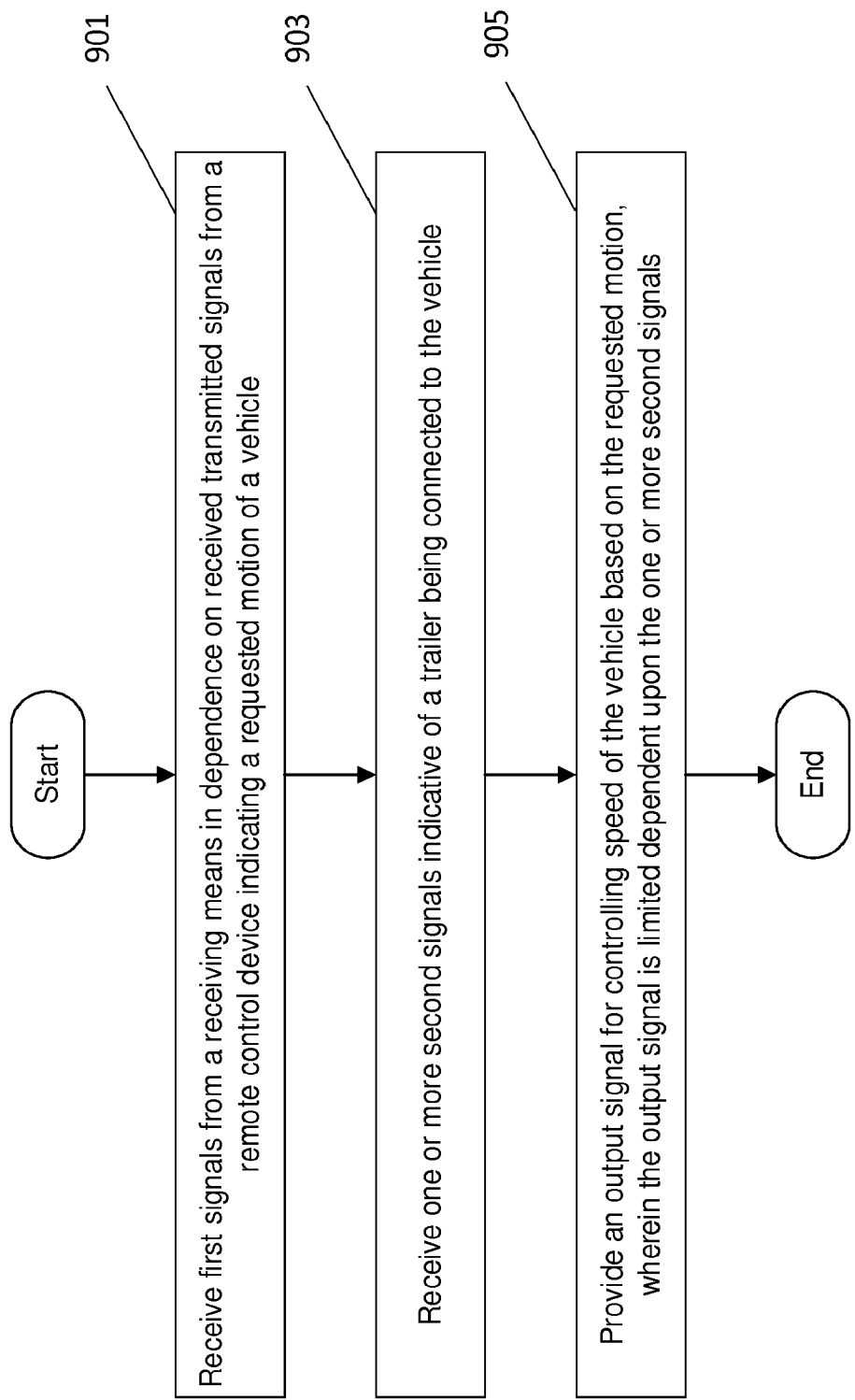
FIG. 9 shows a flowchart of a method of controlling the movement of a vehicle in a remote control mode according to one embodiment.

An example of a method for controlling the movement of a vehicle with a remote drive system is shown in FIG. 9.

In a case where the obstacle to be detected is the user of the remote control device 200, the first signals from the remote control device 200 to the receiver 202 can be used as a proxy for determining the proximity of the remote control device 200 to the receiver 202, ergo the proximity of the user of that remote device to the vehicle 100. For example, the strength of the received signals can be indicative of the distance.

Figure 5:
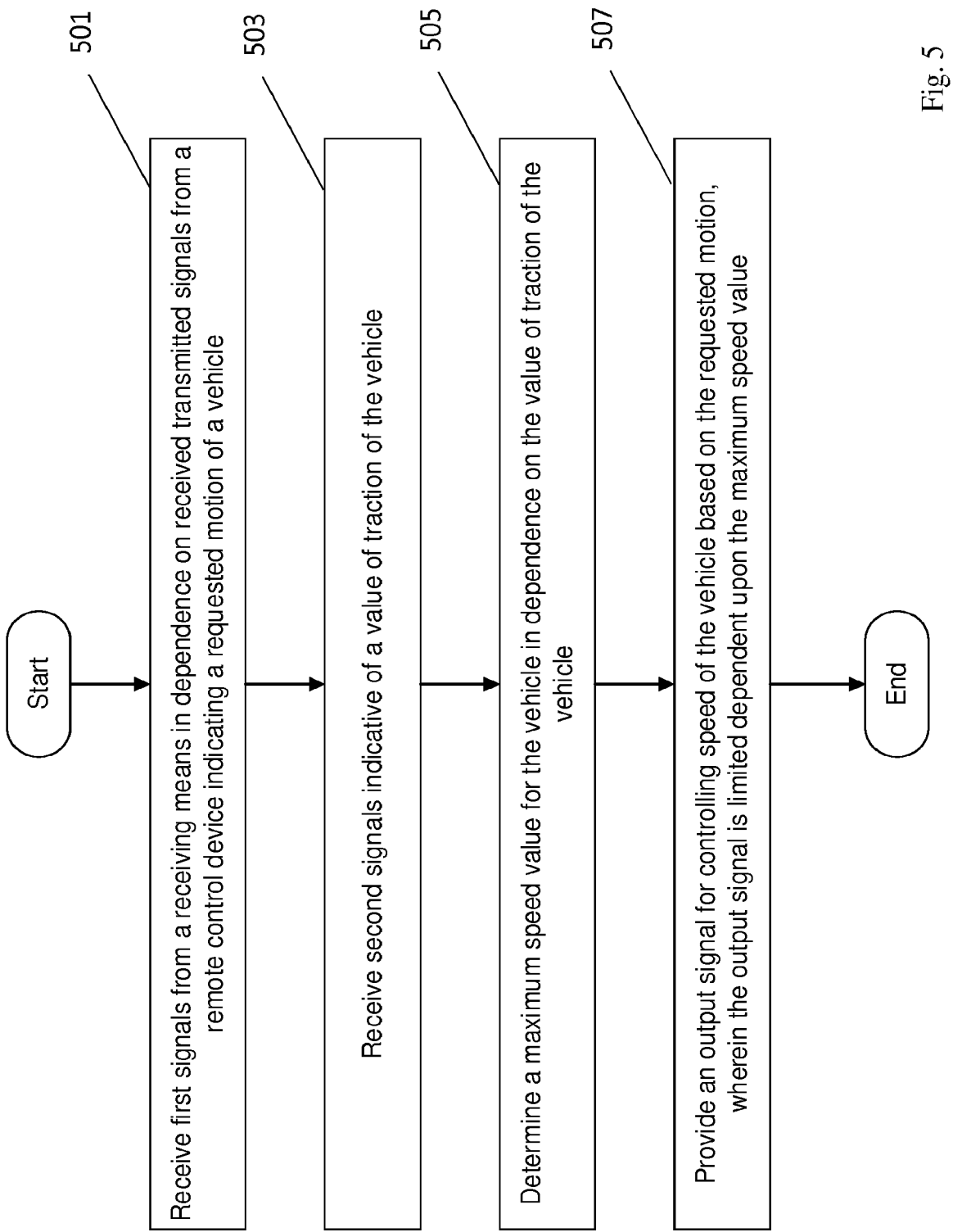
FIG. 5 shows a flowchart of a method of controlling the movement of a vehicle in a remote control mode according to one embodiment.

An example of a method for controlling the movement of a vehicle with a remote drive system is shown in FIG. 5. A schematic example of a processing means, in the form of a controller, for controlling movement of a vehicle is shown in FIG. 3. The controller 10 comprises a processor 10a arranged to perform a method embodying the present invention. A computer program, when executed by the processor 10a, is arranged to perform a method embodying the present invention. The computer program may be stored on a computer-readable medium.

A method 500 of controlling the movement of a vehicle is outlined by the flowchart shown in FIG. 5. At block 501 first signals are received from a receiving means in dependence on the receiving means receiving transmitted signals from a remote control device 200 indicating a requested motion of a vehicle 100. The first signals may be dependent upon the signal strength of the received transmitted signals.

At block 503, second signals indicative of a value of traction of the vehicle 100 are received by the controller 10. The controller 10, at block 505, determines a maximum speed value for the vehicle in dependence on the value of traction of the vehicle and at block 507 provides an output signal for controlling speed of the vehicle 100 based on the requested motion. The output signal is limited dependent upon the maximum speed value. As described above, the determination of the value of traction may be made on the basis of second signals received from at least one vehicle sensor 1000. Optionally, the determination of the maximum speed may be made in dependence on both the value of traction as determined for the vehicle, and a distance value indicative of a distance from a point on the vehicle to an obstacle, as determined from a proximity signal from a proximity sensing means or from the first signals, in the case where the obstacle is the user of the remote control device 200, as explained above.

Figure 6:
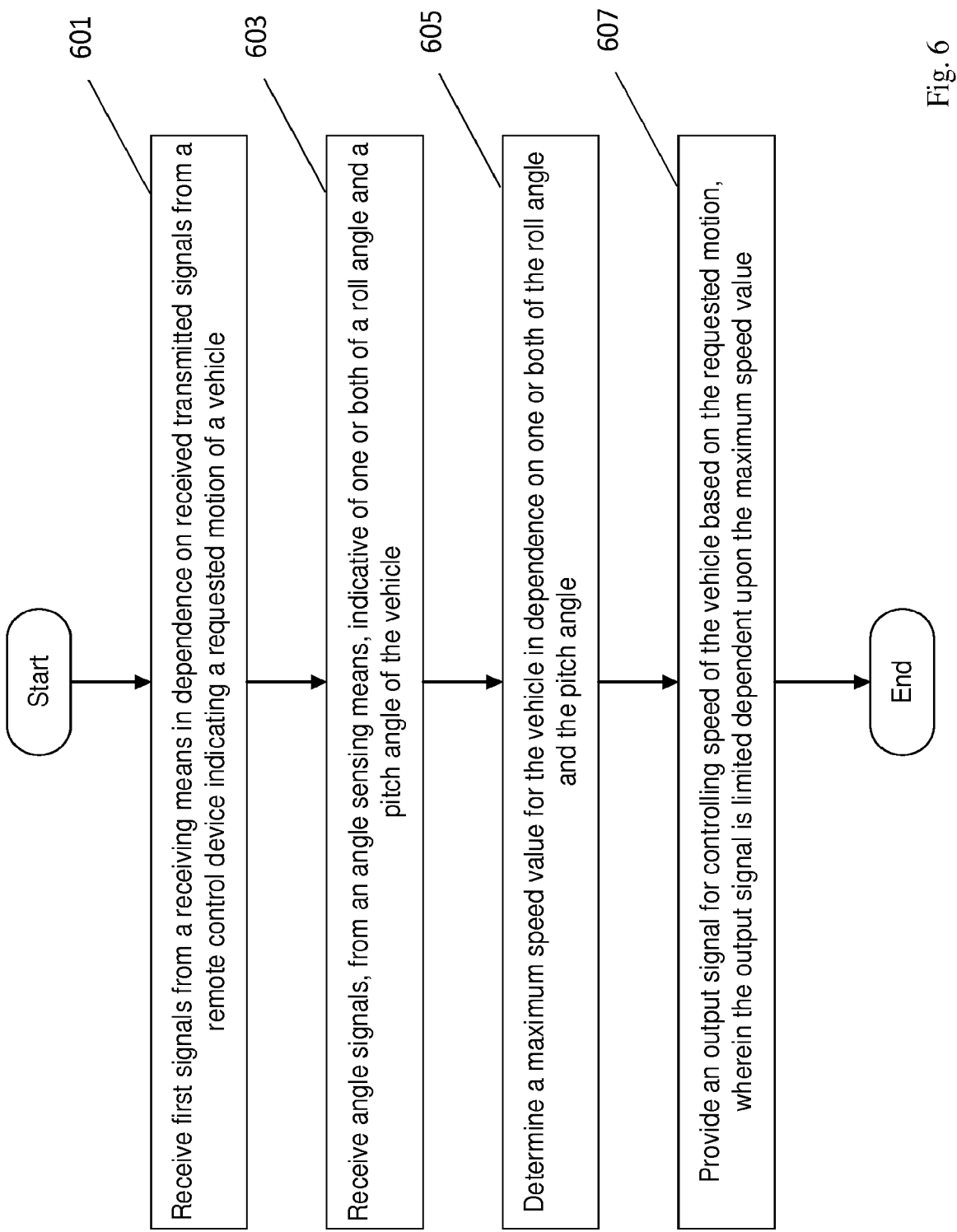
FIG. 6 shows a flowchart of a method of controlling the movement of a vehicle in a remote control mode according to another embodiment.

Another method 600 of controlling the movement of a vehicle is outlined by the flowchart shown in FIG. 6. At block 601 first signals are received from a receiving means in dependence on the receiving means receiving transmitted signals from a remote control device 200 indicating a requested motion of a vehicle 100. The first signals may be dependent upon the signal strength of the received transmitted signals.

At block 603, angle signals indicative of one or both of a roll angle and a pitch angle of the vehicle 100 are received by the controller 10 from an angle sensing means. The controller 10, at block 605, determines a maximum speed value for the vehicle in dependence on one or both of the roll angle and the pitch angle and at block 607 provides an output signal for controlling speed of the vehicle 100 based on the requested motion. The output signal is limited dependent upon the maximum speed value. Optionally, the rates of change of the roll and pitch angles may be taken into account and be included in the angle signals.

In some embodiments according to either of the methods described (i.e. irrespective of whether the maximum speed is determined on the basis of the traction or the contours of the terrain), the output signal is provided to one or both of the powertrain controller 11 and the brake controller 13, so that the speed of the vehicle may be controlled as determined by the maximum speed, for example by the application of power through the drivetrain 124 where the current speed of the vehicle is below that requested by the user of the remote control device 200 (and also not exceeding the maximum permissible speed for the conditions) or through the application of braking force where the current vehicle speed is above the maximum permissible speed for the conditions, as may occur for example by the vehicle 100 moving to a more slippery or steeper piece of terrain.

In some embodiments, again irrespective of which input signals are used to determine the maximum speed for the vehicle, if the conditions are such that the maximum speed is determined to be zero, then the output signal causes the parking brake to be applied and the vehicle transmission 124 to be put in park mode P. In this way, under conditions in which it is unsafe to operate the vehicle in a remote control mode of operation, the vehicle 100 is placed into a safe, secure state if it has been necessary to bring the vehicle to a stop. The user may investigate what has caused this safe state to be entered—for example by inspecting the terrain, and may take action to remedy the situation—for example by moving the vehicle away from the location. This may be done by the user entering the vehicle and driving the vehicle manually until conditions are once again suitable for remote control operation to be effected. The processing means may thus be configured to provide an output signal to prevent operation of the vehicle in a remote control driving mode, thereby only permitting the vehicle to be driven in manual mode until conditions change so that the maximum speed value is determined to be greater than zero. In certain scenarios, the user may be prevented from operating the vehicle in a remote control mode until the conditions have changed—for example by having moved the vehicle (in manual mode) to a different terrain where the traction is higher and/or the contours are less steep—and operation of the vehicle in remote control drive mode can be resumed safely. The same principle can be applied to situations where the vehicle has been prevented from setting off from rest in a remote control drive mode.

In certain embodiments, the user may be able to retrace, still in the remote control mode, the path taken by the vehicle on route to the terrain determined to be unsuitable for navigation in remote control mode (i.e. where the maximum speed has been determined to be zero).

As explained above, in order to determine the value of traction of the vehicle with accuracy, the coefficient of friction between the wheels and the ground is needed. In certain scenarios, a reasonable estimate for the coefficient of friction between a vehicle's tyres and the surface on which they are in contact (the 'ground') may be made, for example where the ground is a dry tarmacked road surface and where the rubber compound and tread of the tyres is known or a reasonable assumption may be made. However, a more accurate determination of the coefficient of friction and, therefore, the value of traction of the vehicle, is desirable, particularly where the ground conditions may be variable—for example for a vehicle intended to be used in both on- and off-road conditions.

According to the standard model, the friction force, f, between two materials is equal to the normal force, N, between those materials multiplied by the coefficient of friction, μ, for those materials:

$$f = \mu N \qquad \text{a.}$$

The friction force is overcome when steering the steered wheels 111,112, so it follows that:

$$f_{steering} \propto \mu N_{steering} \qquad \text{b.}$$

where $f_{steering}$ is the steering force being applied to steerable road wheels 111, 112 as a result of a force applied by a user to the steering wheel 171 in combination with steering force generated by the ePAS unit 170C, and $N_{steering}$ is the normal force (with the ground) at the steered wheels during the application of the steering force.

For a known steering geometry, $f_{steering}$ can be derived directly from a detected steering rack force. A steering rack force sensing means is provided to detect the force applied at the steering rack. This may be a sensor located at the steering rack itself or remote therefrom, for example on the steering column or in connection with the ePAS unit 170C.

Many factors may affect the normal force, $N_{steering}$, including: vehicle weight; weight distribution; wheel loads; wheel speeds; vehicle orientation; vehicle ground speed; vehicle acceleration and deceleration; and tyre pressure. These parameters may be detected independently or may be derived or estimated from other sensed vehicle parameters, such as suspension heights and/or displacements (indicative of vehicle weight and, possibly, weight distribution); roll angle (indicative of left/right weight distribution/loading); pitch angle (indicative of fore/aft weight distribution/loading). If these factors are known, from suitable vehicle sensor outputs, then the coefficient of friction, µ, of the steered tyres with the ground can be inferred from the steering forces applied.

The coefficient of friction is a function of the steering force and the normal force at each of the steered wheels. Accordingly, the coefficient of friction may be calculated, or at least estimated, by measuring a magnitude of steering rack force and by determining or at least estimating the normal force at the steered wheels. Because the normal forces may be different for each of the steered wheels, the respective coefficients of friction for those wheels may be different. An average of the forces may be used.

Hence, the value of traction for the vehicle 100 can be determined accurately and in real time according to the conditions (which may be changing as the vehicle traverses the terrain) from the coefficient of friction, µ, as estimated from the above. If the coefficient of friction, µ, is determined to be of different values for different wheels, then the value of traction for the vehicle may be taken as the smallest of those values so that the vehicle velocity is limited conservatively.

A controller may be provided for determining the value of traction for the vehicle 100. The controller may be a dedicated controller (not shown) for that sole function, or may be integrated with one or more other vehicle controllers, such as the central controller 10. The controller may receive signals from the steering controller 170C indicative of the steering force. The coefficient of friction for the steerable tyres (either singly or as a set) may thus be inferred from the normal force at the steerable wheels and the steering rack force at any given time. From that, the overall value of traction for the vehicle can be determined. The output signal from the controller for determining a value of traction of the vehicle may correspond to the second signals indicative of a value of traction of the vehicle described above. Thus, the method of FIG. 5 may include an optional step of determining the value of traction of the vehicle by inferring a coefficient of friction of at least one of the steered wheels of the vehicle in the manner described. This inference of the coefficient of friction and, therefore, the value of traction of the vehicle may be carried out continuously during a remote control drive operation or it may be carried out intermittently at intervals during remote control drive operation. Optionally, such a step of inferring the coefficient of friction may be required to be carried out, for example at initiation of a request for operation in a remote control drive mode, as a condition of such remote control drive operation being allowed.

Figure 8:
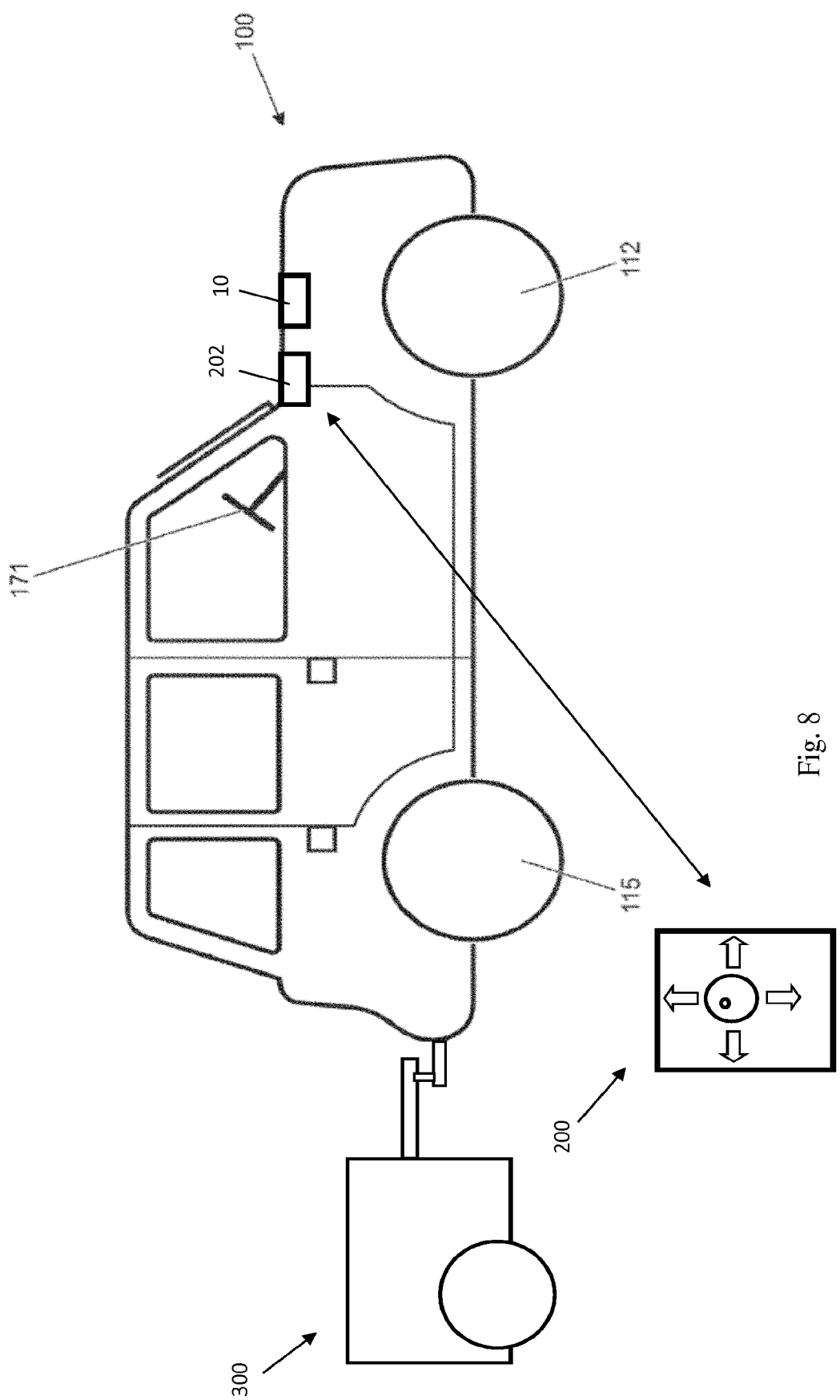
FIG. 8 shows a vehicle and connected trailer and an associated remote control device for use in controlling movement of the vehicle.

A method 900 of controlling the movement of a vehicle is outlined by the flowchart shown in FIG. 9. At block 901 first signals are received from a receiving means in dependence on the receiving means receiving transmitted signals from a remote control device 200 (see FIG. 8, which corresponds to FIG. 2, but with the addition of a trailer 300 connected to the vehicle 100) indicating a requested motion of a vehicle 100. The requested motion of the vehicle includes a requested retardation of the vehicle 100. The first signals may be dependent upon the signal strength of the received transmitted signals.

At block 903, one or more second signals indicative of a trailer being connected to the vehicle are received. As described above, these second signals may be received directly from one or more dedicated connection sensors or from one or more proximity sensors indicative of the connection of a trailer 300 to the vehicle 100. The controller 10, at block 905, provides an output signal for controlling speed of the vehicle 100 based on the requested motion. The output signal is limited dependent on the one or more second signals. So, under normal operating conditions with no trailer present, the second signals will indicate that absence of a connected trailer and the remote control mode will be fully operational (all else being equal). If, however, the second signals indicate that there is (or may be) a trailer 300 connected, then the output signal is at least limited so as to mitigate against a possible increased chance of collision due to the trailer possibly obscuring one or more of the vehicle proximity sensors.

In summary, aspects of the invention provide an apparatus and associated method for ensuring safe operation of a vehicle 100 in a remote control drive mode, limiting the maximum permissible speed of the vehicle in dependence on the terrain on which the vehicle is travelling. In particular, the maximum speed may be limited in slippery conditions—if the traction is below a particular threshold, or over steep contours—if a roll or a pitch angle of the vehicle 100 exceeds a particular threshold. Thus, the vehicle speed can be controlled so that the vehicle 100 can at all times be brought to a safe stop if required. Other aspects of the invention provide an apparatus and associated method for ensuring safe operation of a vehicle in a remote control drive mode, limiting the functionality of the remote control if a trailer is connected to the vehicle, e.g. by setting a maximum permissible speed or only permitting forward motion of the vehicle, or totally inhibiting operation in remote control mode. The presence of the trailer may be detected through one or more dedicated sensors, through a signal on the CAN bus, or through inference from proximity sensors. In particular, parking sensors may indicate the presence of an object at a set gap from the vehicle, and this can be indicative of the connection of a trailer, especially if the gap remains substantially constant during movement of the vehicle.

References herein to a block such as a function block are to be understood to include reference to items of vehicle hardware, such as electronic modules, and to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

A trailer is defined as any component that may be connected at a rear end of a vehicle, to be towed by or otherwise moved with the vehicle. A trailer would typically be a wheeled component, but may in certain embodiments have other ground-engaging means, such as tracks or skis, or may not engage the ground at all—such as a rack for attachment to the rear of the vehicle (e.g. a bicycle rack). At its simplest, a trailer may be connected to the vehicle by a rope or similar connection. Other trailers would be connected by dedicated mechanical connection members, such as for attachment to a tow-bar on the vehicle, as is well known in the art. In addition, the trailer may have electrical components, such as lights, that may be connected electronically to the vehicle to be powered and controlled via the vehicle's electrical system.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

We claim:

1. An apparatus for controlling movement of a vehicle, the apparatus comprising:
   an electronic memory device having stored instructions; and
   an electronic processor electrically coupled to the electronic memory device, the electronic processor including an electrical input for receiving first signals and second signals, the electronic processor being configured to:
   receive the first signals in dependence on received transmitted signals from a remote control device indicating a requested motion of the vehicle;
   receive the second signals indicating a value of traction available to the vehicle;
   determine a maximum speed value for the vehicle in dependence on the value of traction available to the vehicle; and
   provide an output signal for controlling a speed of the vehicle based on the requested motion to limit the speed of the vehicle to a speed at or below the maximum speed value,
   wherein the value of traction available to the vehicle is classified into discrete levels, and the maximum speed value is dependent on the level to which the value of traction available to the vehicle is classified.

2. The apparatus according to claim 1, wherein the electronic processor is configured to:
   compare the value of traction available to the vehicle to a first threshold value and a second threshold value; and
   increase the maximum speed value level in dependence on the value of traction available to the vehicle being above the second threshold value;
   decrease the maximum speed value level in dependence on the value of traction available to the vehicle being above the first threshold value and below the second threshold value; or
   set a maximum speed value level of zero in dependence on the value of traction available to the vehicle being below the first threshold value.

3. The apparatus according to claim 1, wherein the electronic processor is configured to determine the value of traction available to the vehicle by processing the second signals.

4. The apparatus according to claim 1, wherein the electronic processor is configured to receive the second signals from at least one vehicle sensor.

5. The apparatus according to claim 4, wherein the vehicle sensor provides data indicating at least one of: wheel speeds; wheel loads; suspension heights; vehicle orientation; roll angle; pitch angle; vehicle ground speed; vehicle acceleration and deceleration; and steering rack force.

6. The apparatus according to claim 1, comprising at least one vehicle controller and wherein the electronic processor is configured to receive the second signals from the at least one vehicle controller, and wherein the at least one vehicle controller provides data indicating at least one of: a coefficient of friction of tires with a surface with which the tires are in contact; automatic brake system intervention; and traction control intervention.

7. The apparatus according to claim 1, wherein the electronic processor is configured to determine, from the first signals or additional proximity signals received from a proximity sensor, a distance value indicating a distance from a point on the vehicle to an obstacle, and wherein the maximum speed value for the vehicle is determined in dependence on the value of traction available to the vehicle and on the distance value.

8. The apparatus according to claim 1, wherein the electronic processor is configured to determine, from additional angle signals received from an angle sensor, one or both of a roll angle and a pitch angle of the vehicle, and wherein the maximum speed value for the vehicle is determined in dependence on the value of traction available to the vehicle and on one or both of the roll angle and the pitch angle.

9. The apparatus according to claim 1, wherein the electronic processor is configured to provide an output signal to cause a parking brake of the vehicle to be applied and a vehicle transmission to be put into park mode in dependence on the maximum speed value being determined to be zero.

10. A vehicle comprising the apparatus of claim 1.

11. An apparatus for controlling movement of a vehicle, the apparatus comprising a processor configured to:
    receive first signals from a receiver in dependence on received signals transmitted from a remote control device indicating a requested motion of a vehicle;
    receive one or more second signals indicating that a trailer is connected to the vehicle; and
    provide an output signal for controlling movement of the vehicle based on the requested motion,
    wherein the output signal is dependent on the one or more second signals.

12. An apparatus according to claim 11, wherein the output signal is inhibited in dependence on the one or more second signals.

13. An apparatus according to claim 11, wherein the output signal is for limiting the speed of the vehicle to a maximum speed value.

14. An apparatus according to claim 13, wherein the maximum speed value is zero.

15. An apparatus according to claim 14, wherein the output signal is for applying a braking force to the vehicle.

16. An apparatus according to claim 11, wherein the output is for only permitting forward motion of the vehicle.

17. An apparatus according to claim 11, wherein receiving the one or more second signals comprises receiving a trailer connection signal from a trailer connection sensor.

18. An apparatus according to claim 17, wherein the trailer connection sensor comprises one or more proximity sensors and wherein receiving the trailer connection signal comprises receiving a signal output in dependence on the one or more proximity sensors detecting the presence of an object at a set distance from the vehicle.

19. The apparatus according to claim 11, wherein the receiver receives the received signals via a wireless local area network.

20. A vehicle comprising the apparatus of claim 11.

* * * * *